United States Patent
Peleg et al.

(10) Patent No.: US 7,826,608 B1
(45) Date of Patent: Nov. 2, 2010

(54) SYSTEMS AND METHODS FOR CALCULATING WORKFORCE STAFFING STATISTICS

(75) Inventors: Uri Peleg, Santa Clara, CA (US); Mike Bourke, San Francisco, CA (US); Jason Fama, Foster City, CA (US); Vinod Prabhu, Fremont, CA (US)

(73) Assignee: Verint Americas Inc., Melville, NY (US)

( * ) Notice: Subject to any disclaimer, the term of this patent is extended or adjusted under 35 U.S.C. 154(b) by 1251 days.

(21) Appl. No.: 11/394,795

(22) Filed: Mar. 31, 2006

(51) Int. Cl.
*H04M 3/00* (2006.01)
(52) U.S. Cl. ...................... 379/266.07; 705/9
(58) Field of Classification Search .............. 705/9; 379/265.06, 265.09, 265.12, 266.02
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner*—Creighton Smith

(57) ABSTRACT

Systems and methods for determining workforce staffing statistics in a contact center are disclosed. In one embodiment, the method comprises the steps of: receiving activity records associated with agents; and producing queue-specific staff counts for an interval. The counts are based on an activity record subset, and an agent skill, and a contact queue skill set. In one embodiment, the system comprises: an activity collector operative to receive events; and a staff statistics calculator operative to determine a staff count for a specified staffing interval. Each of the events describes a worker activity. In this embodiment, the calculator comprises: logic for receiving activity records derived from one of the events; logic for identifying contact queues for each worker in the activity records; and logic for incrementing a contact queue staff count if at least one skill for the respective worker is included in the respective contact skill set.

18 Claims, 6 Drawing Sheets

U.S. PATENT DOCUMENTS

| | | | |
|---|---|---|---|
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,535,256 | A | 7/1996 | Maloney et al. |
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Puram et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,574 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazar |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,766,012 | B1 * | 7/2004 | Crossley ................ 379/265.02 |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,959,078 | B1 | 10/2005 | Eilbacher et al. |
| 6,965,886 | B2 | 11/2005 | Govrin et al. |
| 7,418,094 | B2 * | 8/2008 | Golitsin et al. ......... 379/265.12 |
| 7,478,051 | B2 * | 1/2009 | Nourbakhsh et al. ........... 705/9 |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0018554 | A1 * | 2/2002 | Jensen et al. ........... 379/265.01 |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143597 | A1 * | 10/2002 | Andre et al. .................... 705/9 |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2003/0177017 | A1 * | 9/2003 | Boyer et al. .................... 705/1 |
| 2004/0100507 | A1 | 5/2004 | Hayner et al. |
| 2004/0165717 | A1 | 8/2004 | McIlwaine et al. |

| | | | |
|---|---|---|---|
| 2005/0125439 A1* | 6/2005 | Nourbakhsh et al. | 707/102 |
| 2005/0138560 A1 | 6/2005 | Lee et al. | |
| 2006/0282301 A1* | 12/2006 | Olson | 705/9 |
| 2007/0071222 A1* | 3/2007 | Flockhart et al. | 379/265.02 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 97.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, Sep. 28, 1996.
Kenny. *TV Meets Internet*, PC World Online, Mar. 28, 1996.
Linderholm. *Avatar Debuts Home Theater PC*, *PC* World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson. *U.S. West Revisits Interactive TV*, Interactive Week, Nov. 28, 1999.

* cited by examiner

SYSTEMS AND METHODS FOR CALCULATING WORKFORCE STAFFING STATISTICS

FIELD OF THE DISCLOSURE

The present disclosure relates to software for contact centers, and more specifically, to a systems and methods for calculating workforce staffing statistics.

BACKGROUND

The business of a contact center is to provide rapid and efficient interaction between agents and customers, or prospective customers, using various interaction methods and media, including phone, fax, e-mail and messaging. A manager in a contact center typically uses force management software (FMS) to produce a schedule that includes agents assigned to work activities for specific time periods. During the workday, the FMS produces staffing statistics. The manager uses staffing statistics to adjust the number of agents assigned to particular activities when the contact center performance is either above or below contact center goals (e.g., a desired service level.) If performance exceeds the goals, the manager can reduce the number of agents. If performance does not meet goals, the manager can add more agents to the schedule.

Skills-based routing attempts to find the best available match between the needs of the customer and the various proficiencies or skills of available agents. Providing staffing statistics in a skills-based environment is difficult. One problem is providing an accurate count of agents. A multi-skill agent could be counted against more than one (skill) queue. A conventional FMS simply counts an agent with multiple skills against all queues, resulting in an miscount. Furthermore, a conventional FMS reports one combined count, rather than a count for each skill-related queue.

SUMMARY OF THE INVENTION

Systems and methods are disclosed for determining workforce staffing statistics in a contact center. In one embodiment, the method comprises the steps of: receiving a plurality of activity records; and producing staff counts for a staffing interval. Each activity record is associated with an agent. The staff counts are based on at least some of the activity records, and on agent skill sets, and on queue skill sets.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
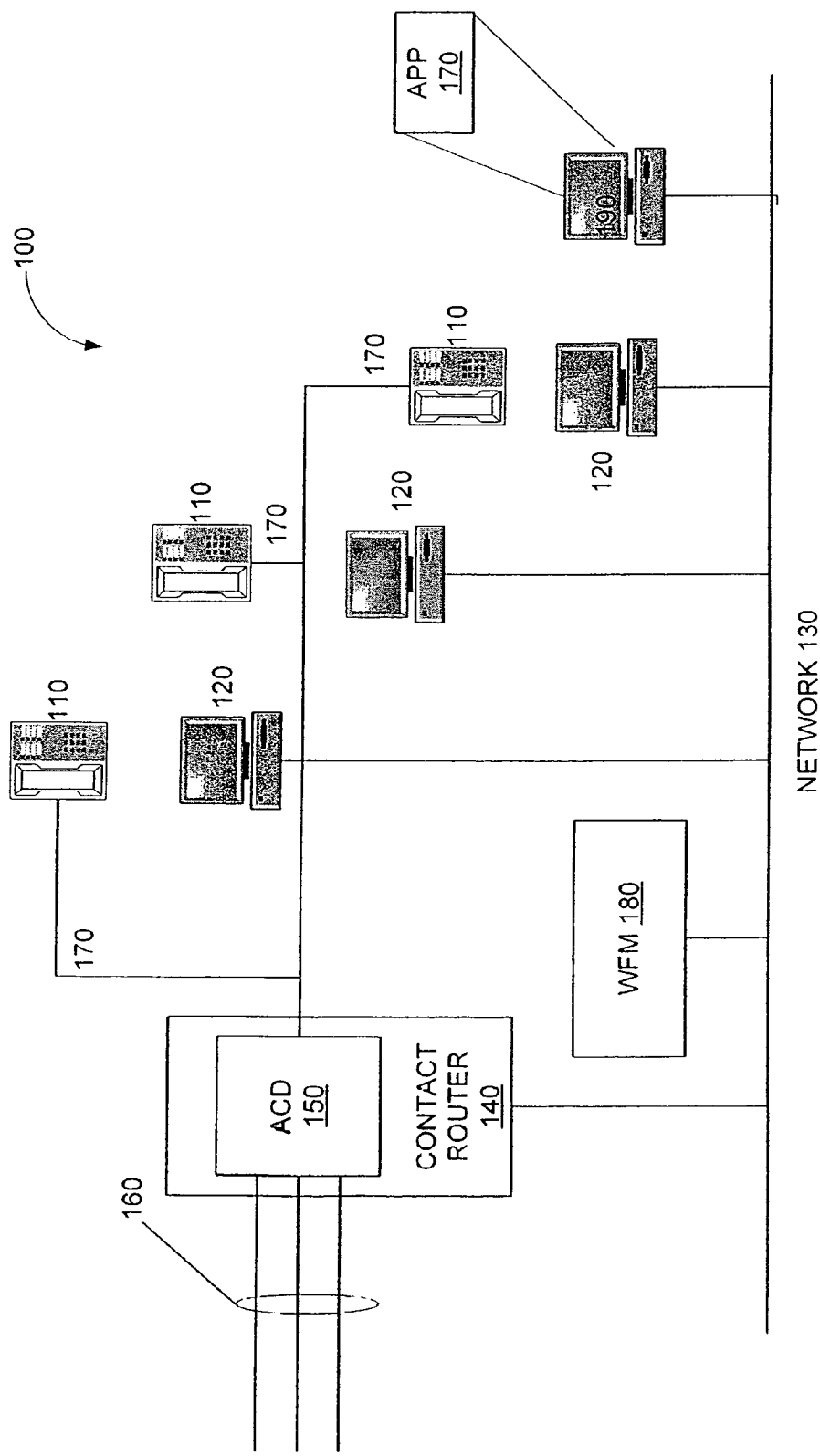
FIG. 1 is a block diagram of a contact center environment for an embodiment of a system and method for calculating workforce staffing statistics from activity records.

FIG. 1 is a block diagram of a contact center environment 100. The contact center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 120 to route phone contacts. The embodiments described herein will refer to the ACD 120 instead of contact router 140, but analogous contact router actions and operations are intended to be captured by this disclosure.

If an agent is not available to handle a particular call, ACD 120 puts the call into a queue, which effectively places the caller on hold. When an agent is available, ACD 120 connecting the outside trunk line 150 carrying the phone call to one of the agents. More specifically, ACD 120 connects the outside trunk line 150 to the trunk line 160 of the selected agent.

When an agent is ready to handle contacts, the agent first logs into the contact router 140. This login notifies the contact router 140 that the agent is available to generate outgoing contacts or to handle incoming contacts. An agent's state with respect to the router changes throughout the workday, as the agent performs work activities such as handling calls, performing after-call work, and taking breaks. An example list of states includes available, busy, after-call work, and unavailable.

While handling a contact, the agent interacts with one or more applications 170 running on workstation 120. By way of example, workstation applications could provide the agent with access to customer records, product information, ordering status, and transaction history. The applications may access one or more business databases (not shown) via network 130.

The contact center 100 also includes a work force management system (WFMS) 180. WFMS 180 performs many functions. One of these functions is calculating staffing levels and agent schedules based on historical patterns of incoming calls. Another function of WFMS 180 is collecting call center contact statistics and providing this information, both historical and real-time, to the call center supervisor or manager. Some of these statistics are typically displayed on a periodic basis in a "pulse" window. The pulse window is used by a call center manager to obtain a quick summary of call center operations during the last period. One statistic commonly shown in a pulse window is an actual staff count for the last period.

The WFMS 180 also maintains a list of agents and skills associated with each agent. Examples of agent skills include knowledge of a particular product or process (e.g., customer service or sales), and the ability to speak a particular language (e.g., Spanish). This agent-skill association information is provided to contact router 140 so that contact router 140 can route calls based on agent skills, as shown in FIG. 2.

As each agent 210 begins work in the contact center, the agent 210 logs in to contact router 140. Contact router 140 uses the agent login information to determine the skills associated with an agent. Each skill is associated with one or more queues 230.

Figure 2:
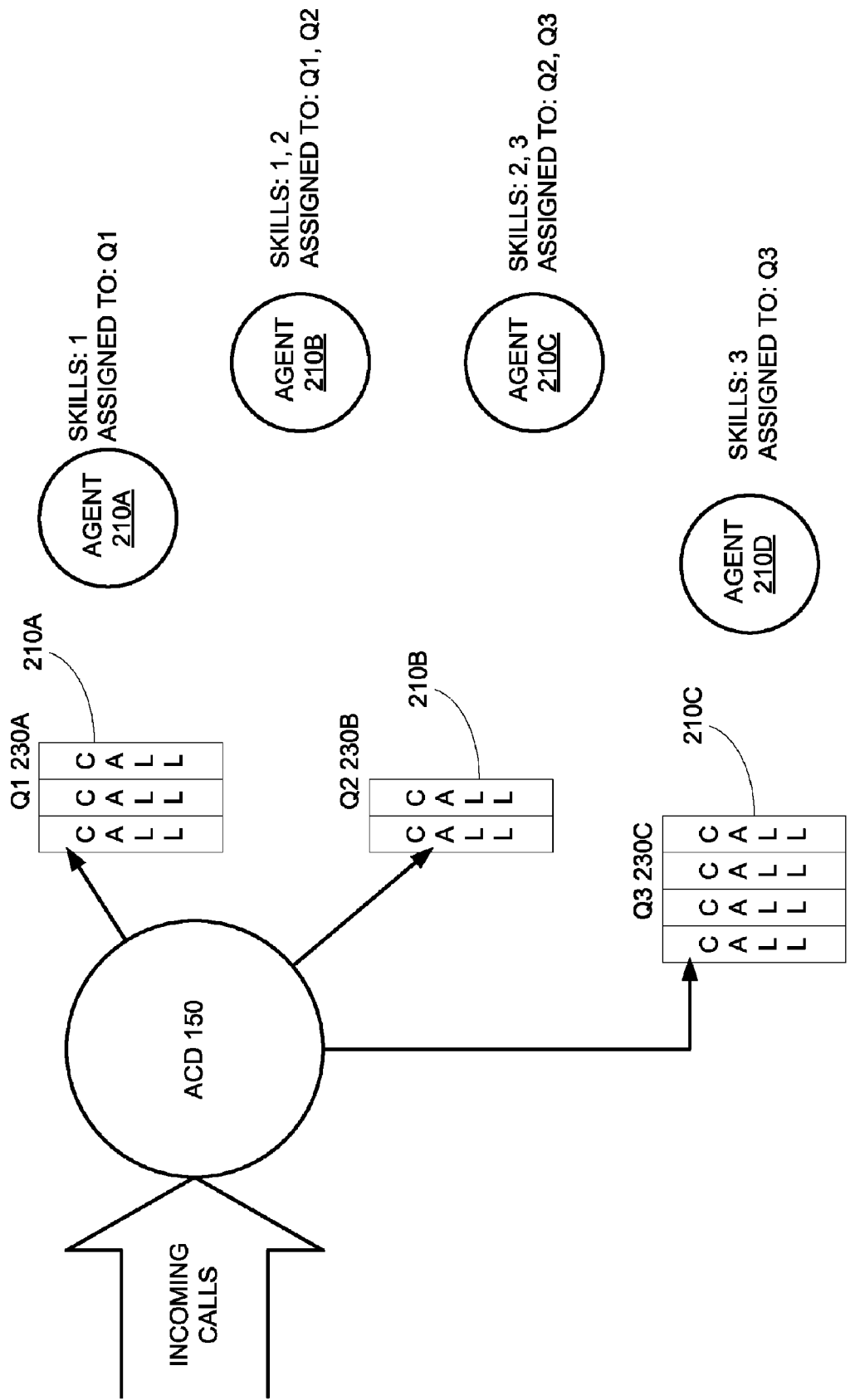
FIG. 2 illustrates the process of contact routing based on agent skills, according to one embodiment of a system and method for calculating workforce staffing statistics from activity records.

For example, the scenario shown in FIG. 2 includes four agents (210A-D) and three queues (230A-C). Agent 210A has only one skill (1), and is therefore associated with queue #1 (230A). Agent 210B has two skills (1, 2) and is therefore associated with queue #1 (230A) and queue #2 (230B). Agent 210C also has two skills (2, 3), and is therefore associated with queue #2 (230B) and queue #3 (230C). Finally, agent 210D has a single skill (3), and is therefore associated with queue #3 (230C).

The contact router 140 receives incoming contacts and distributes each contact 220 to one of a set of queues 230, where each queue 230 is associated with a particular agent skill. The contacts 220 remain queued until an agent 210 with appropriate skills is available.

To determine in which queue 230 a contact is to be placed, the contact router 140 identifies which agent skills the contact relates to. The contact router 140 makes this determination by classifying the contact based on various parameters, such as customer input (e.g., touchtone or interactive voice recognition) or contact information (e.g. called number or calling number). Based on this classification, the contact is then distributed to a particular queue 230, handled by agents having that skill. Two simple examples of classification are: customer presses 1 for English, or 2 for Spanish; customer dials one toll-free number for Sales or a different number for Customer Service. In that example, contacts classified as "Spanish" would be routed to a queue associated with an agent having a Spanish-speaking skill.

As an agent 210 becomes available to handle a contact 220, the contact router 140 routes, to that agent 210, the next contact in one of the queues 230 associated with that agent 210. In this scenario, all four agents are available to handle contacts. Thus, the first contact in queue #1 (220A) could be routed to agent 210A or agent 210B. The first contact in queue #2 (220B) could be routed to agent 210B or agent 210C. The first contact in queue #3 (220C) could be routed to agent 210C or agent 210D.

Figure 3:
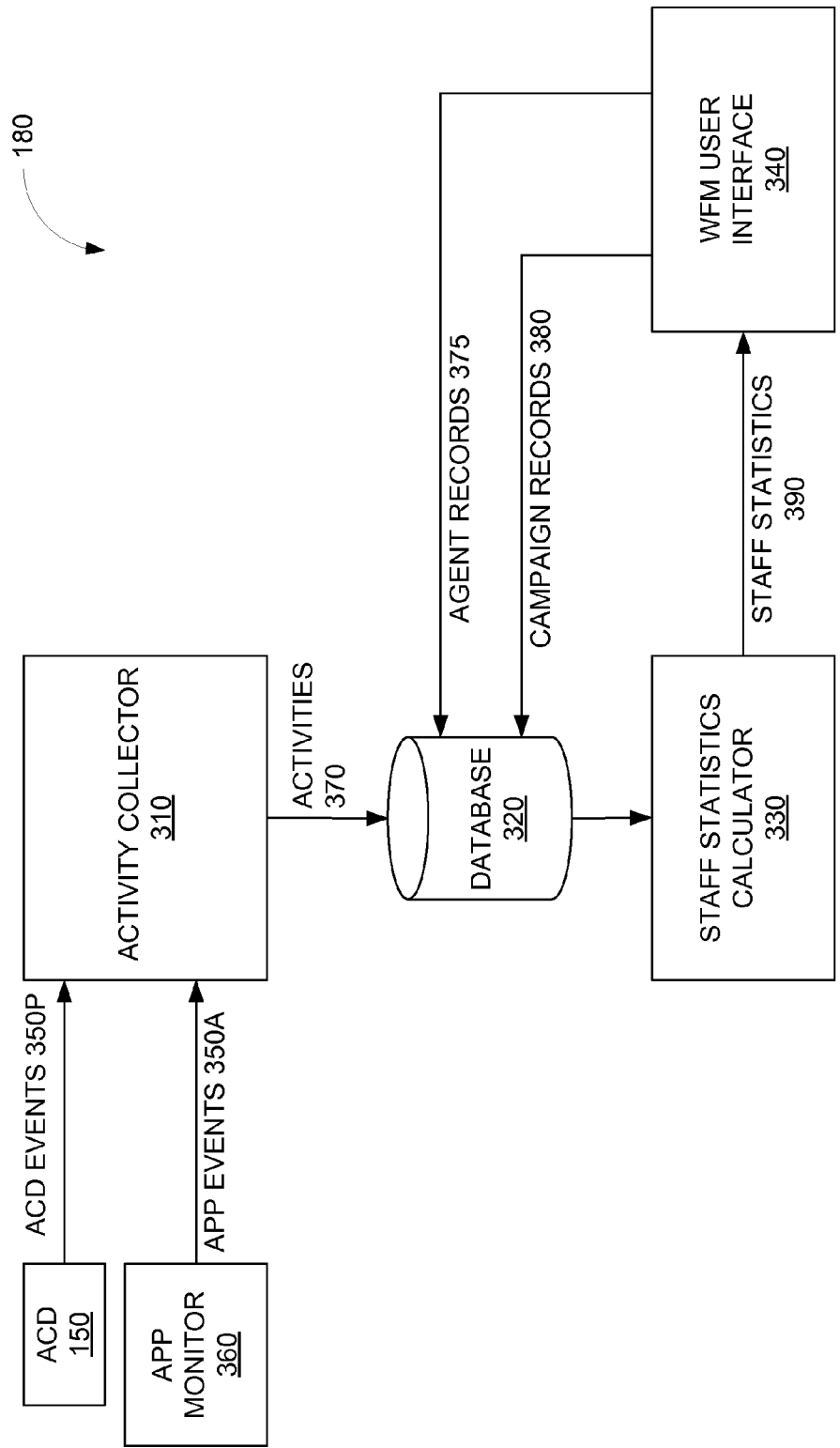
FIG. 3 is a block diagram showing several components of the WFMS of FIG. 1.

FIG. 3 is a block diagram showing several components of the WFMS 180, including an activity collector 310, an activity database 320, a staff statistics calculator 330, and a user interface 340. As an agent handles contacts throughout a workday, the contact router 140 reports changes in the state of the agent's phone to the WFMS 180, as ACD events 350P. As an agent interacts with various applications 170 on his workstation 120, an application monitor 360 tracks and reports application events 350A to the WFMS 180. In some embodiments, the granularity of application events 350A is application-level, so that events describe when applications start and exit, and when a user switches from one application to another. In other embodiments, the granularity is screen-level (events describe a particular screen displayed within an application) or low-level (events describe input and/or output associated with each application such as keystrokes, mouse clicks, and screen updates).

The collector 310 receives these events 350 from multiple sources. An event 350 has an occurrence time and a descriptor which includes fields such as event source (e.g., ACD, application monitor), type, and agent identifier. If the event 350 does not include an agent identifier, the collector 310 maps the phone or workstation identifier to a corresponding agent identifier based on information obtained at agent login. Thus, the event 350 indicates, either directly or indirectly, an agent identifier.

From the reported events 350, the collector 310 creates agent activity records 370, and stores them in the database 320. In some embodiments, the activity records 370 stored in the database 320 include an agent identifier, an activity source, an activity code, a start time, a stop time, and a duration.

The database 320 stores various other types of records also. A contact center manager uses the user interface 340 to create agent records 375, each of which includes the skill(s) possessed by each agent. The user interface 340 is also used to create campaign records 380, each of which includes a set of ACD queues which is associated with the campaign.

A person of ordinary skill in the art of software development will understand that the data organization described above is only one way among many to organize database 320. Database 320 can be organized in many other ways that allow the same relationships to be expressed, and all such organizations are intended to be captured by this disclosure.

The staff statistics calculator 330 uses the information provided by the activity records 370, agent records 375, and campaign records 380 to calculate per-queue staff statistics 390 for a staffing interval. The staff statistics calculator 330 produces queue-specific staff counts for the interval, based on activity records, skill sets associated with agents, and skill sets associated with contact queues. In some embodiments, staff statistics 390 include a body, or staff, count. As will be understood by one skilled in the art, a staff count is the number of agents logged into a queue in some time interval. The body count does not take into account the fact that agents with multiple skills can handle multiple queues, and therefore divide their time among specific queues (associated with the agent's skills). In some embodiments, staff statistics 390 include a full-time equivalent (FTE) count. As will also be understood by one skilled in the art, an FTE count is the number of dedicated agents needed to achieve the service levels being seen on a queue. Thus, the FTE count does take into account the way agents divide their time among queues, and that agents with multiple skills are more efficient. In some embodiments, the calculation of staff statistics 390 is run periodically, and in others the calculation is performed on demand.

The staff statistics calculator 330 will now be described in further detail. Although an activity record 370 describes which agent 210 performed the activity, an activity record 370 does not directly specify which of the queues 230 the agent was servicing at the time associated with the activity. Therefore, the staff statistics calculator 330 performs further processing to determine which ACD queue or queues 230 an agent 210 is counted against when calculating the per-queue staff statistics 390.

Figure 4:
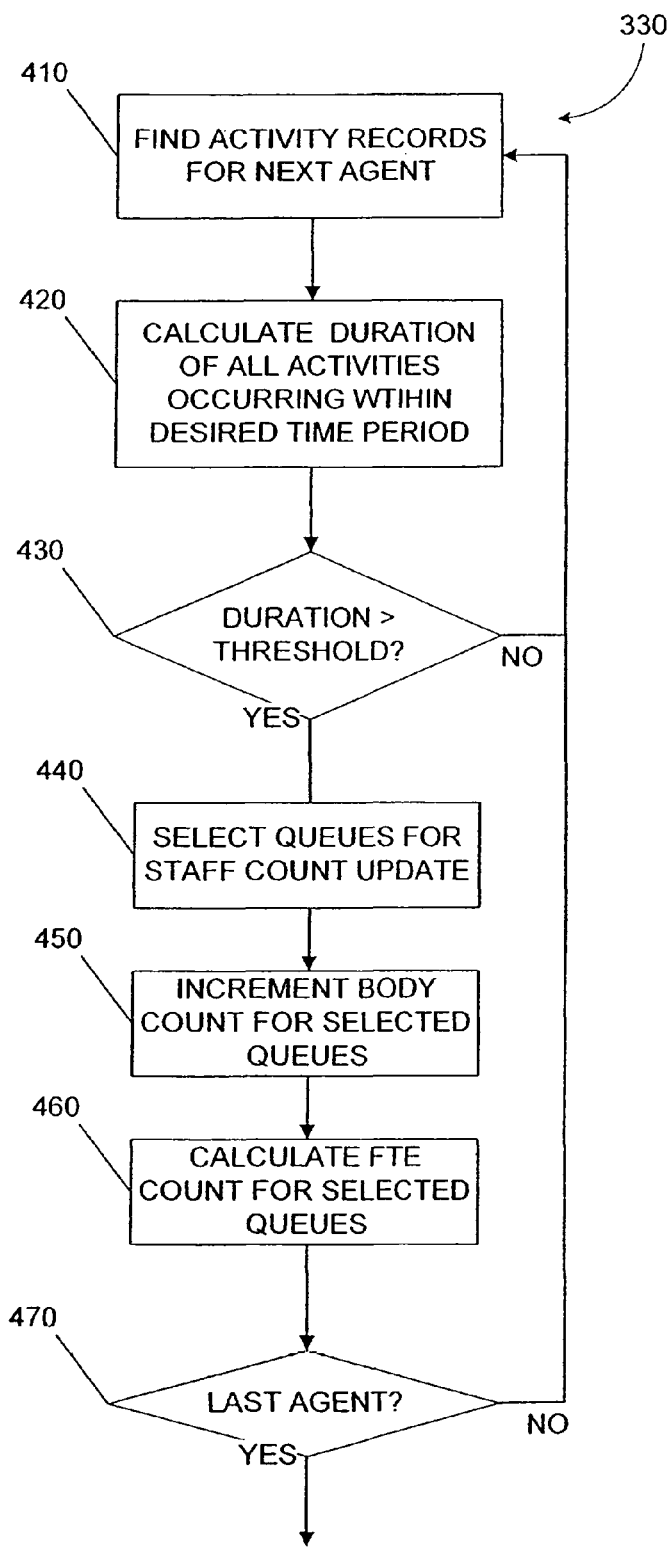
FIG. 4 is a flowchart of one implementation of the staff statistics calculator of FIG. 3.

FIG. 4 is a flowchart depicting functionality of an embodiment of the staff statistics calculator 330. At block 410, the activity records 370 for an agent 210 are retrieved. Next (block 420), the activity records 370 are examined to determine the duration of all activities occurring within the desired time period. At block 430, the total duration is compared to a threshold. If the threshold is not met, then processing continues with the next agent 210, at block 410.

If the total duration threshold is met, then processing continues at block 440, where a subset of queues is selected. The queue selection process will be described in further detail later, in connection with FIG. 5. Next (block 450), the body count in each of the per-queue staff statistics 390 is incremented by one for each of queues selected in block 440. At block 460, the full time equivalent (FTE) count in the per-queue staff statistics 390 is calculated for each of queues selected in block 440. By way of example, calculation of FTE counts can be performed using a reverse Erlang C formula, as follows $$P_c = \frac{\frac{E^N}{N!} \times \frac{N}{N-E}}{\sum \left( \frac{E^X}{X!} + \left( \frac{E^N}{N!} \times \frac{N}{N-E} \right) \right)}$$

where $P_c$ is the probability that a customer will experience a non zero delay, E is the total traffic offered (in Erlangs), and N is the total number of resources available. One of ordinary skill in the art should understand Erlang calculations, so this will not be discussed in further detail.

At block 470, a determination is made as to whether all agents 210 have been processed. If Yes, then processing is finished. If No, then processing continues with the next agent 210, at block 410.

Figure 5:
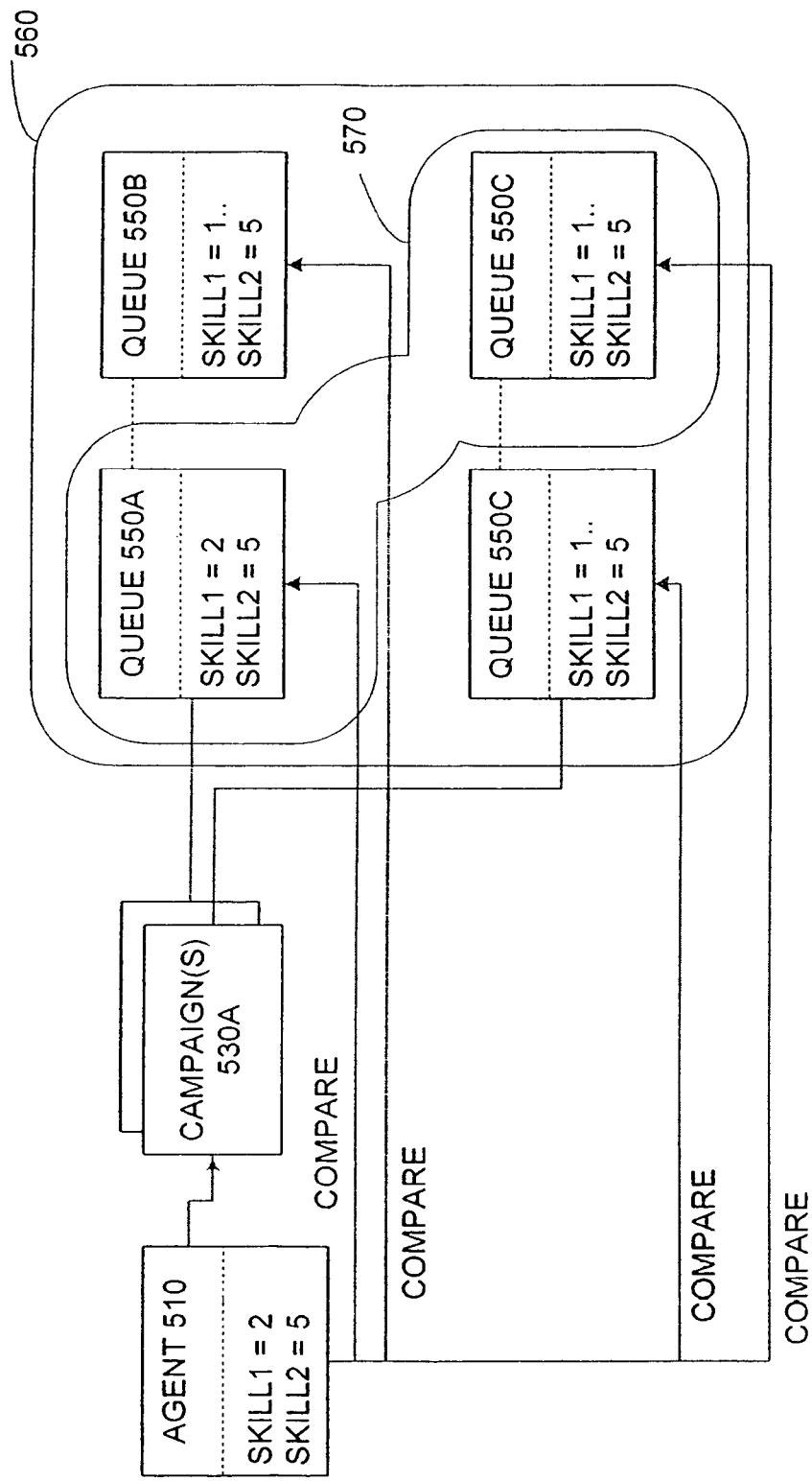
FIG. 5 is a data flow diagram of one embodiment of the queue selection process of FIG. 4.

FIG. 5 is a data flow diagram of an embodiment of the queue selection process 440. An agent record 510 is provided as input to the queue selection process 440. In the implementation shown in FIG. 5, the agent record 510 has an association (520) with one or more campaign records 530, and each campaign record 530 has an association (540) with one or more queue records 550. Thus, each agent record 510 is associated, through one or more campaign records 530, with a set (560) of one or more queue records. In another implementations (not shown), the campaign feature may not be present, thus an agent can be directly associated with a queue.

Using information in the agent record 510, a subset 570 of the set 560 of queue records is selected for update as follows. For each queue record 550 in the set 560, the skill list (580) of the queue record 550 is compared with the skill list (590) of the agent record 510. In the case of a queue skill list 580 with no skills, then the queue record 550 is put into the selection subset 570. Otherwise, the matching queue record 550 goes into the selection subset 570 if all skills in the queue skill list 580 are found in the agent skill list 590. Instead of adding queues to an initially-empty selection subset, an alternative embodiment could instead produce a selection set by removing queues with non-matching skills from the original set 560 of queue records.

For example, in the scenario shown in FIG. 5, agent record 510 has an association with two campaigns (530A, 530B). Campaign 530A has an association with two queues (550A, 550B). Campaign 530B has an association with two queues (550C, 550D). The original queue set 560 thus comprises four queues, 550A-D.

The agent skill list 590 includes two skills: 2 and 5. Only one of the four queues has a skill list 580 that includes both skill 2 and skill 5: queue 550A. Thus, queue 550A goes into the selection subset 570. Queue 550D also goes into the selection subset 570 because queue 550D has no skills in the queue skill list 580.

Another implementation of queue selection process 440 (not shown) handles distributed campaigns. A distributed campaign uses at least one distributed queue, which is represented as a parent queue having a list of (normal) child queues. In this implementation, queue selection process 440 further expands the selection subset 570 by including in the selection subset 570 the parent of each child queue record. Thus, the staff statistics 390 are incremented for the parent queue as well as the child queue.

In another variation of staff statistics calculator 330, each contact queue 230 is associated with a media type (e.g., phone, e-mail, or chat). The staff statistics calculator 330 in this embodiment computes the staff counts for a particular media, or across all media (a feature called "combined staffing".) When this multi-media embodiment is combined with a distributed campaign embodiment, the staff statistics 390 for the child queue are incremented only if that queue is associated with the same data source as the agent under consideration.

Figure 6:
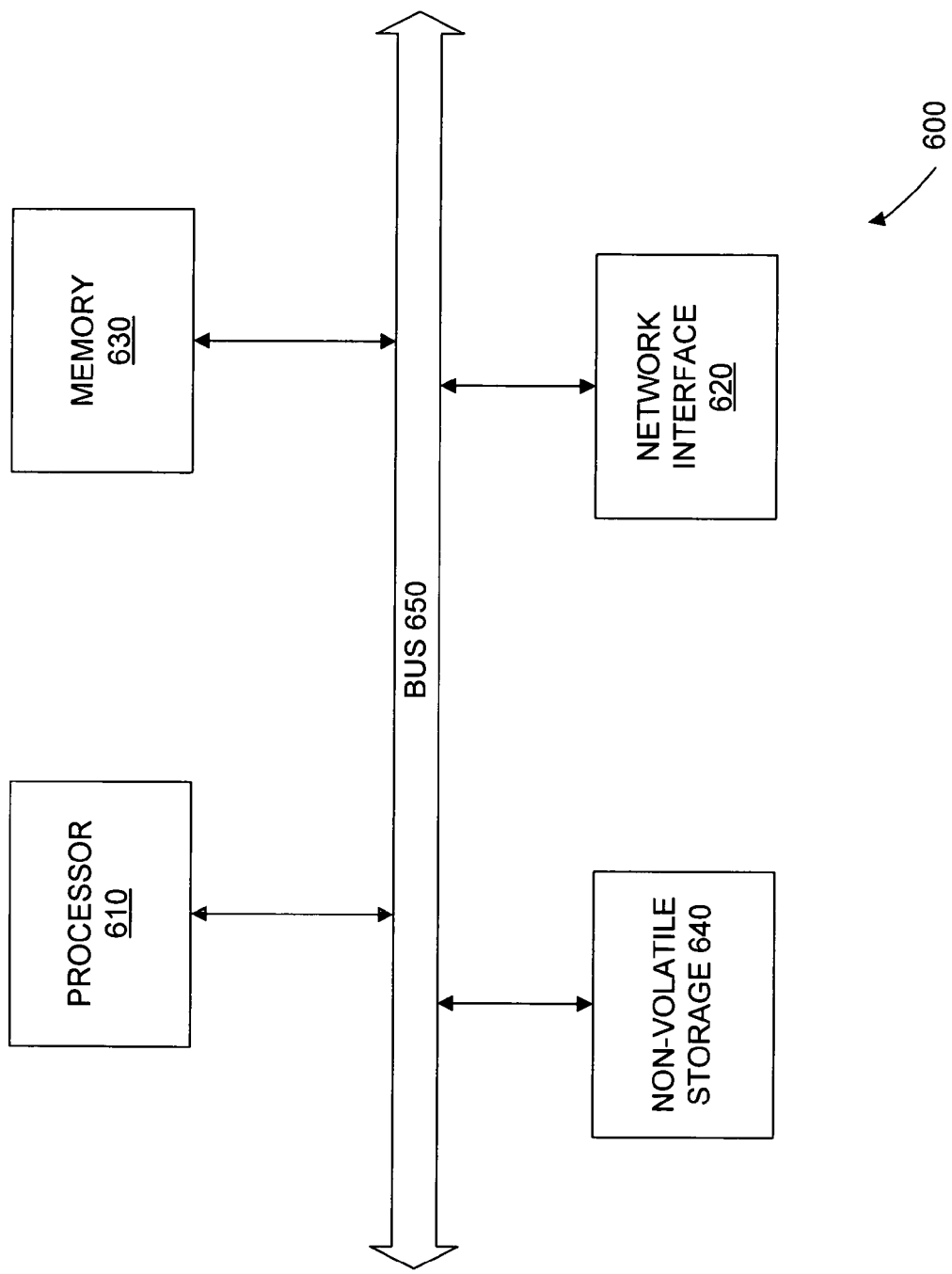
FIG. 6 is a hardware block diagram of a general-purpose computer which can be used to implement systems and methods for calculating workforce staffing statistics from activity records.

FIG. 6 is a hardware block diagram of a general-purpose computer 600 which can be used to implement the system and method for calculating workforce staffing statistics from activity records. The computer 600 contains a number of components that are well known in the art of contact center software, including a processor 610, a network interface 620, memory 630, and non-volatile storage 640. Examples of non-volatile storage include, for example, a hard disk, flash RAM, flash ROM, EEPROM, etc. These components are coupled via a bus 650. The memory 630 contains instructions which, when executed by the processor 610, implement the system and method for calculating workforce staffing statistics from activity records such as the process depicted in the flowcharts and dataflow diagrams of FIGS. 4 and 5. Omitted from FIG. 6 are a number of conventional components, known to those skilled in the art, that are unnecessary to explain the operation of system 600.

The systems and methods for calculating workforce staffing statistics from activity records disclosed herein can be implemented in software, hardware, or a combination thereof. In some embodiments, the system and/or method is implemented in software that is stored in a memory and that is executed by a suitable microprocessor situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology. The functionality could also be implemented in logic embodied in hardware or software-configured media.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology includes (but are not limited to): an optical fiber; and a portable compact disk read-only memory (CD-ROM).

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

We claim:

1. A method for determining workforce staffing statistics in a contact center, the method comprising the steps of:
   receiving a plurality of activity records, each activity record associated with one of a plurality of agents;
   producing a plurality of queue-specific staff counts for a specified staffing interval, based on at least a subset of the activity records, on a skill set associated with each of the agents, and on a skill set associated with each of a plurality of contact queues;
   calculating, based on the received activity records associated with the agent, a total duration for an activity type;
   if the total duration exceeds a threshold, selecting, from the plurality of contact queues, a subset of queues for which one of the staff counts will be incremented;
   incrementing the staff count associated with each of the selected subset of queues.

2. The method of claim 1, wherein the selecting step further comprises the step of:
   selecting contact queues for which at least one skill in the set associated with the worker matches at least one skill in the set associated with the respective contact queue.

3. The method of claim 1, wherein the incrementing step further comprises the step of:
   incrementing, by one, a staff count associated with each of the selected subset of queues.

4. The method of claim 1, wherein the incrementing step further comprises the step of:
   calculating a full time equivalent (FTE) for each of the selected subset of queues; and
   incrementing an FTE count associated with each of the selected subset of queues by the calculated FTE.

5. The method of claim 1, wherein each of the contact queues is associated with a media type, and further comprising the step of:
   determining a plurality of staff counts for a specified staffing interval and for a specified media type, based on at least a subset of the activity records, on a skill set associated with each of the workers, and on a skill set associated with each of a plurality of contact queues.

6. The method of claim 1, wherein the threshold is half the specified staffing interval.

7. The method of claim 1, wherein each activity record describes a work activity performed by one of the workers during a time period.

8. A system for determining workforce staffing statistics in a contact center, the program comprising the steps of:
   an activity collector operative to receive events, each of the events describing an activity associated with a worker;
   a staff statistics calculator operative to determine a plurality of staff counts for a specified staffing interval, wherein the calculator comprises:
      logic for receiving a plurality of activity records, each activity record derived from one of the received events;
      logic for identifying one or more contact queues associated with each worker described in the plurality of activity records;
      logic for calculating, based on the plurality of activity record, a total duration for an activity type;
      logic for if the total duration exceeds a threshold, selecting, from the contact queues, a subset of queues for which one of the staff counts will be incremented; and
      logic for incrementing a staff count associated with each of the contact queues, if at least one of a set of skills associated with the respective worker is included in a set of skills associated with the respective contact queue.

9. The system of claim 8, wherein the staff statistics calculator further comprises:
   logic for calculating, based on the received activity records associated with one of the workers, a total duration for an activity type; and
   logic for performing the incrementing step only if the total duration exceeds a threshold.

10. The system of claim 8, wherein the staff statistics calculator further comprises:
    logic for incrementing, by one, a staff count associated with each of the contact queues, if at least one of the skills in the worker skill set is included in the respective contact queue skill set.

11. The system of claim 8, wherein the staff statistics calculator further comprises:
    logic for calculating a full time equivalent (FTE) count associated with each of the contact queues, if at least one of the skills in the worker skill set is included in the respective contact queue skill set; and
    logic for incrementing an FTE count associated with one of the contact queues by the calculated FTE.

12. The system of claim 8, wherein the staff statistics calculator further comprises:
    logic for identifying one or more campaigns associated with the worker; and
    logic for identifying one or more contact queues associated with each of the one or more campaigns.

13. The method of claim 1, wherein the threshold is half the specified staffing interval.

14. A computer-readable medium having a computer program stored thereon, the computer program comprising computer-executable instructions for performing a computer-executed method for determining workforce staffing statistics in a contact center, the method comprising the steps of:
    receiving an activity record describing one of a plurality of workers;
    identifying one or more contact queues associated with the worker described by the activity record;
    comparing a skill set associated with the worker and a skill set associated with each of the contact queues;
    calculating, based on the plurality of activity record, a total duration for an activity type;
    if the total duration exceeds a threshold, selecting, from the contact queues, a subset of queues for which one of the staff counts will be incremented; and incrementing a staff count associated with each of the contact queues, if at least one of the skills in the worker skill set is included in the respective contact queue skill set.

15. The computer-readable medium of claim 14, wherein the incrementing step further comprises the step of:

incrementing, by one, a staff count associated with each of the contact queues, if at least one of the skills in the worker skill set is included in the respective contact queue skill set.

16. The computer-readable medium of claim 14, wherein the incrementing step further comprises the steps of:

calculating a full time equivalent (FTE) count associated with each of the contact queues, if at least one of the skills in the worker skill set is included in the respective contact queue skill set; and incrementing an FTE count associated with one of the contact queues by the calculated FTE.

17. The computer-readable medium of claim 14, wherein the identifying step further comprises the step of:

identifying one or more campaigns associated with the worker; and identifying one or more contact queues associated with each of the one or more campaigns.

18. The computer-readable medium of claim 14, wherein each of the contact queues is associated with a media type, and further comprising the steps of:

identifying one or more contact queues associated with the worker described by the activity record and associated with a specified media type;

comparing a skill set associated with the worker and a skill set associated with each of the determined contact queues; and incrementing a staff count associated with each of the contact queues, if at least one of the skills in the worker skill set is included in the respective contact queue skill set.

* * * * *